Patented Jan. 8, 1924.

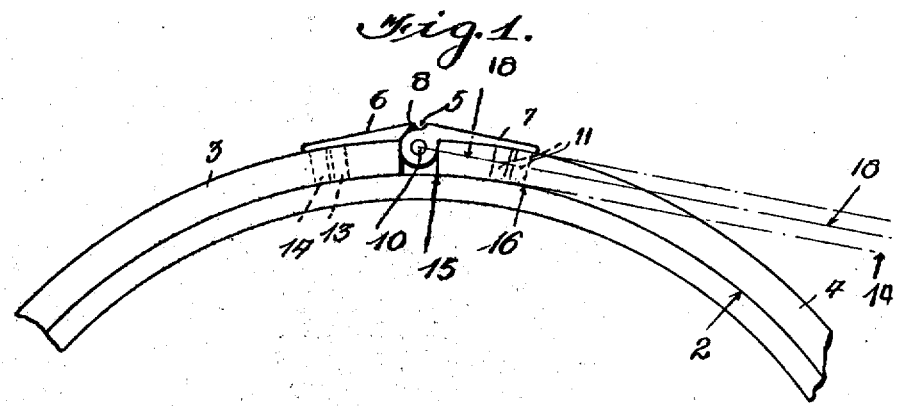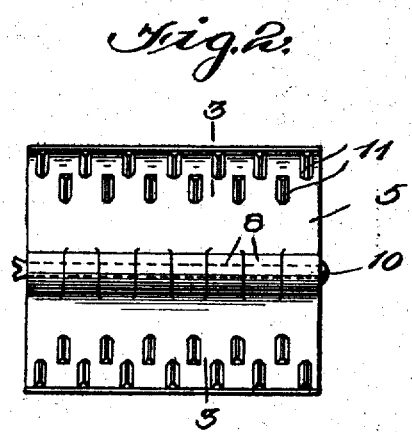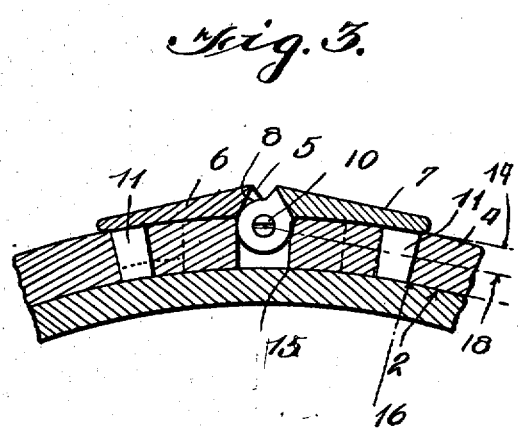

1,479,850

UNITED STATES PATENT OFFICE.

WILLIAM H. BRADSHAW, OF LANSDOWNE, PENNSYLVANIA, AND HENRY W. LYNDALL, OF WILMINGTON, DELAWARE, ASSIGNORS TO MAIN BELTING COMPANY, OF PHILADELPHIA, PENNSYLVANIA, A CORPORATION OF PENNSYLVANIA.

BELT FASTENER.

Application filed May 23, 1921. Serial No. 471,687.

*To all whom it may concern:*

Be it known that we, WILLIAM H. BRADSHAW and HENRY W. LYNDALL, citizens of the United States, residing at Lansdowne, Delaware County, Pennsylvania, and Wilmington, in the county of New Castle and State of Delaware, respectively, have invented certain new and useful Improvements in Belt Fasteners, of which the following is a specification.

This invention relates to improvements in belt fasteners and more particularly to that type of fastener adapted to engage and connect the adjacent ends of a belt to hold the same in a relatively fixed position.

One of the objects of the present invention is to provide an improved belt fastener of the above general character scientifically constructed, yet simple and practical and one which may be easily and inexpensively manufactured.

Another object is to provide a belt fastener of the above character having relatively few parts which may be readily stamped from sheet metal or formed from any suitable material such as brass, or cast iron which is subsequently made malleable, whereby the adjacent ends of the belt may be connected with a minimum amount of trouble and expense.

A further object is to provide a belt fastener of the above character which will be more reliable and efficient in use and cooperate with the adjacent ends of a belt in a manner adapted to prevent tearing out at the point of connection and also prevent breakage or cracking of the belt adjacent the outer edges of the fasteners as so often occurs in the present types of construction in general use.

A further object is to provide a belt fastener of the above character which will more easily and smoothly pass around the circumference of a pulley without leaving the surface of the pulley at any time, thereby eliminating jars or shocks common to the present type of fastener. Such a type obviously increases the efficiency in that the surface of the belt is at all times in engagement with the surface of the pulley from the moment it co-acts therewith to the moment it leaves the same.

In order that the present invention may be more clearly understood, it may be stated at the outset that the present type of fastener is particularly adapted for use in connection with belts employed in train lighting systems. These belts, as is well known to those familiar with the art, are exposed to extreme atmospheric conditions as well as the dust and dirt of the road. They are particularly subjected to severe shocks and jars due to starting, stopping or coupling of cars and the twisting and turning action due to the relative location of the pulleys carried by the generator on the car and the car axle. Heretofore with certain types of belt fasteners so applied, there has been a decided tendency for the fabric, or material of the belt, to crack or break adjacent the transverse edge of the fastener due to the change in angularity between the free portion of the belt and that portion that is made solid and unyielding by reason of its engagement with the fastener. This point has perhaps been appreciated for many years, and for the past half century inventors have sought to overcome this objection, among others, by the employment of a two part fastener constructed on the general plan of a door hinge, on the assumption that the adjacent ends of the belt and associated fastener would more easily accommodate themselves to the curvature of the pulley as the belt passes therearound. These inventors have never taken into scientific consideration the relative location of the point of turning or rather the theoretical axis of the pintle of the hinge with respect to the line of pull or effort exerted by the belt, and the present invention hereinafter described is designed to overcome the above, among other, objections heretofore common in this art, and as forming part of the present disclosure a single sheet of drawings is attached, in which—

Figure 1 illustrates diagrammatically in elevation the periphery of a pulley and section of the belt and fastener; and Figure 2 is a bottom plan view of the fastener.

Figure 3 is a section on line 3—3 Figure 2.

Referring to Figure 1, in detail, 2 denotes a portion of the periphery of a pulley and 3 and 4 are the adjacent ends of the belt adapted to be connected by a hinged fastener 5 such as shown in Figure 2. This fastener comprises hinged members or leaves 6 and 7, the backs of which are substantially flat while the under surfaces are curved to conform to the curvature of the surface of the pulley 2. The parts 6 and 7 are provided with a plurality of interfitting projections 8 having central openings through which a pivot or pintle 10 is adapted to pass. Both leaves or parts of the fastener are provided with a plurality of fastening devices which are preferably in the form of relatively flat longitudinally disposed wedge-shaped teeth 11 arranged in parallel rows as indicated at 12 and 13 at the left of Figure 1, the teeth of one row being arranged in staggered relation with respect to the teeth in the other row as more clearly shown in Figure 2 of the drawings. For convenience of the following explanation, there is indicated in dotted lines a portion of the belt 14 tangent to the pulley at the point 16 which is the outer edge of the outer row of teeth 11, as the belt would appear when leaving the pulley.

The determination of the location of the pivot pin is obtained as follows: There is first drawn a section of the belt 15—16, in contact with the pulley, as well as a portion 16, 14 in dotted lines, tangent to the pulley at 16. A line is then drawn to indicate the central plane of the belt through the part 14 denoted by the line 18. This indicates the center plane of effort of the belt and on this center line the pin 10 should be located. The axis of the pin 10 lies in a plane substantially normal to a radius of the inner curved surface at the outer edge of the outer fastening devices of said member, and at a point on said radius in from the curved surface of said member a distance equal to half the thickness of the belt to which the device is adapted to be attached. It will be evident to those skilled in the art that if the pin 10 were located above this line the belt would bend along the transverse line 16, after it left the pulley, in order to permit the pin to assume a position on this line of effort. If, on the other hand, the pin 10 were positioned below the line 18, it would bend in the opposite direction in order to permit the pin to assume a location on this line. By so locating the pin as indicated above, two important points have been accomplished: first, the oscillation of the hook or fastener about the pin is reduced to a minimum; second, the bending of the belt back of the hook or along the line 16 is entirely eliminated. Since the breaking of a belt at the hook or fastener is due almost entirely to this bending, which would occur on other hooks along a line corresponding to the line 16, a very desirable feature in belt hook construction has been attained. As previously stated, the hook or fastener may be made of any desired material such as pressed steel, dropped forged malleable iron, etc. The latter, however, is preferable for it has been found by repeated experiments and long experience under practical conditions that teeth cast integral with the back of the fastener as herein shown will hold the end of the belt far more tenaciously than any other method of fastening.

By constructing the back of the hook or fastener, as shown, the hook may be laid upon a piece of flat iron or the like while the belt is being applied without danger of distorting the curvature of the under surface of the hook. Heretofore where curved hooks or fasteners have been used, they are usually completely flattened before the application of the belt was completed and frequently reversed in curvature so that the outside of the back was straight and the inside is convex. This, of course, entirely destroyed the value of the fastener so far as it related to the accomplishment of the elimination of the objections above noted, for, under such conditions the pivot point of the fastener would be out of the plane of effort of the belt and consequently it would bend along the line 16 at every revolution and shortly crack the belt at that line.

It is believed that the above will so clearly reveal the principal features of the present invention and the objects accomplished thereby that a further statement of the use and operation are believed to be unnecessary. The invention is a simple, practical construction, reliable and efficient in use, and far more durable in operation with the associated belt than fasteners now on the market.

We claim:

1. In a device of the character described adapted to connect the adjacent ends of a belt, comprising two complementary fastener members hinged together along their adjacent edges, the outer surfaces of said members being flat, the inner surfaces of said members being curved substantially to the curvature of a pulley with which it is to be used, and fastening devices on the curved surfaces adapted to secure a belt thereto, and a pivot pin.

2. In a device of the character described adapted to connect the adjacent ends of a belt, comprising two complementary fastener members hinged together along their adjacent edges, the outer surfaces of said members being flat, the inner surfaces of said members being curved substantially to the curvature of a pulley with which it is to be used, fastening devices on the curved surfaces adapted to secure a belt thereto, and a pivot pin whose axis is located substantially in the central plane of effort of that portion of the belt, as it leaves the pulley, which is tangent to the pulley at the outer edge of the outer fastening means while the complementary members and adjacent parts of the belt are still in engagement with the pulley.

3. In a device of the character described adapted to connect the adjacent ends of a belt comprising two complementary fastener members hinged together along their adjacent edges, the outer surfaces of said members being flat, the inner surfaces of said members being curved substantially to the curvature of a pulley with which it is to be used, fastening devices on the curved surfaces adapted to secure a belt thereto, and a pivot pin whose axis is located substantially in the central plane of effort of the belt to which the fastener has been applied.

4. In a device of the character described adapted to connect the adjacent ends of a belt comprising two complementary fastener members hinged together along their adjacent edges, the outer surfaces of said members being flat, the inner surfaces of said members being curved substantially to the curvature of a pulley with which it is to be used, fastening devices on the curved surfaces adapted to secure a belt thereto, and a pivot pin whose axis is located substantially in the central plane of effort of the belt to which the fastener has been applied when said plane of effort is tangent to a circle concentric with the pulley over which the belt is passing at a line passing through the outer edge of the outer fastening devices.

In testimony whereof we affix our signatures.

WILLIAM H. BRADSHAW.
HENRY W. LYNDALL.